G. T. PEARCE.
GRAIN SEPARATOR AND CLEANER.
APPLICATION FILED JUNE 26, 1908.

985,696.

Patented Feb. 28, 1911.

3 SHEETS—SHEET 1.

WITNESSES:

George T. Pearce,
INVENTOR.

BY
ATTORNEY.

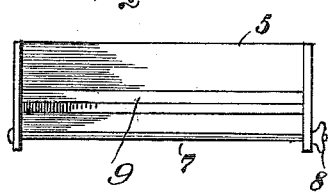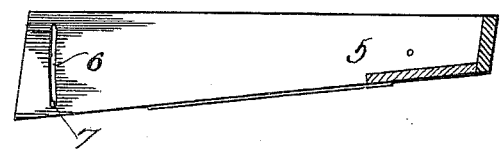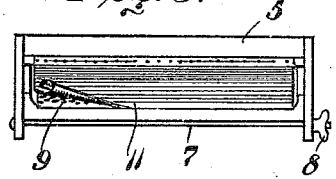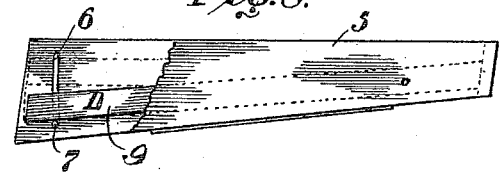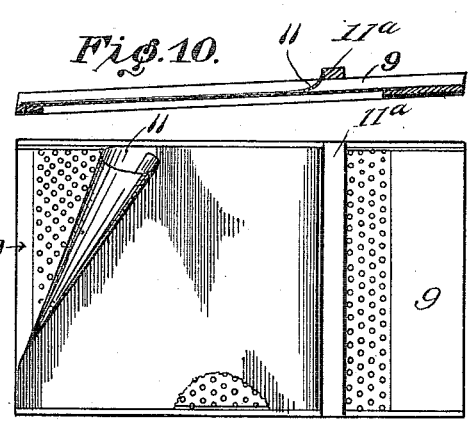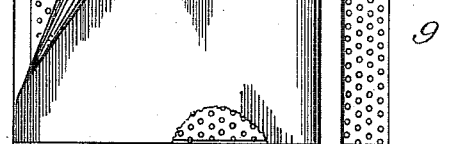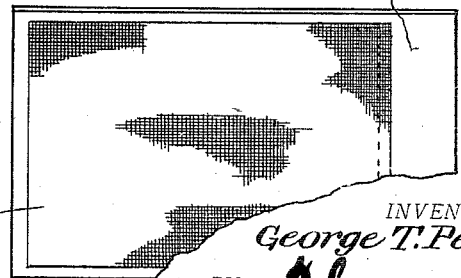

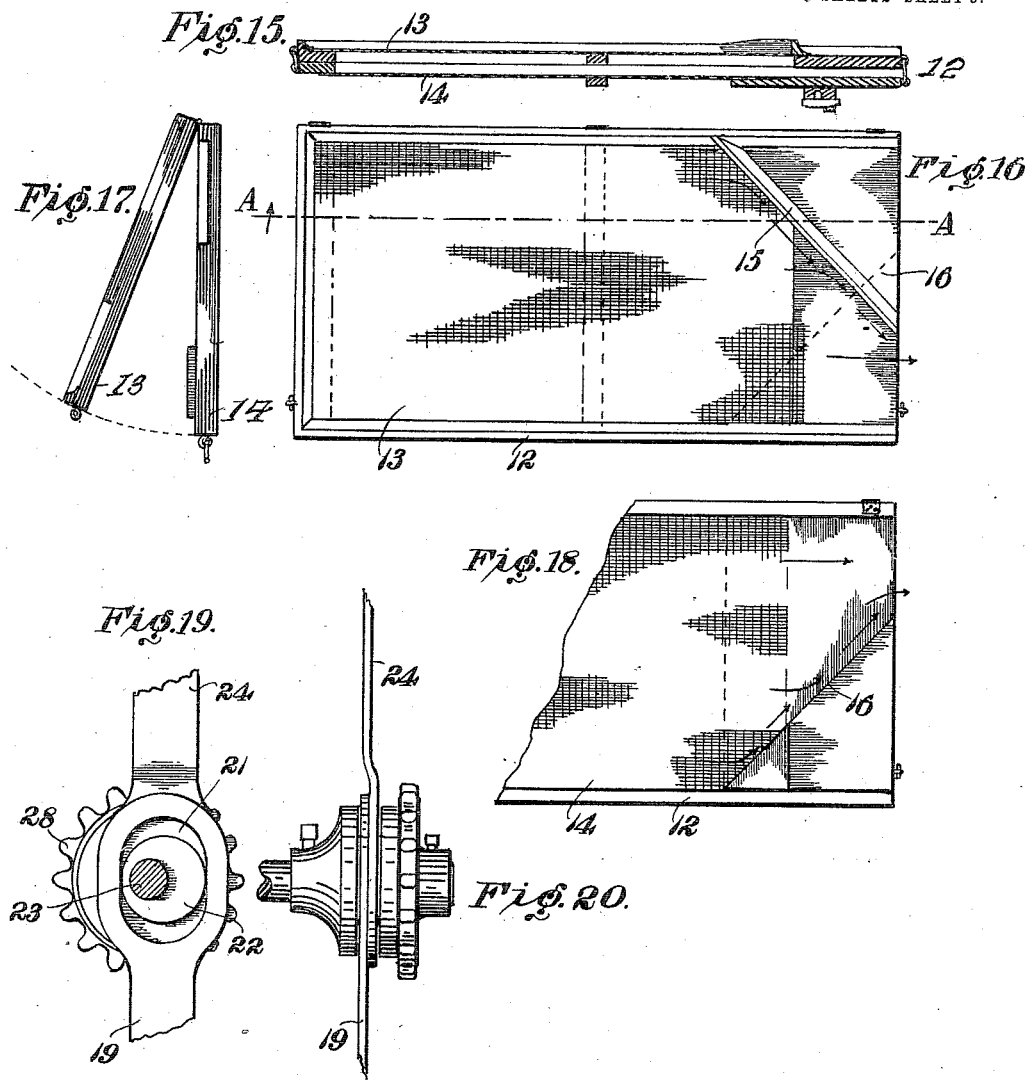

UNITED STATES PATENT OFFICE.

GEORGE T. PEARCE, OF STERLING, KANSAS.

GRAIN SEPARATOR AND CLEANER.

985,696.     Specification of Letters Patent.     Patented Feb. 28, 1911.

Application filed June 26, 1908. Serial No. 440,525.

*To all whom it may concern:*

Be it known that I, GEORGE T. PEARCE, citizen of the United States, residing at Sterling, in the county of Rice and State of Kansas, have invented certain new and useful Improvements in Grain Separators and Cleaners, of which the following is a specification.

The object of the present invention is to provide a machine for cleaning and separating grain, in which the parts may be easily disassembled for shipping and storing, the parts being so made as to be capable of shipment in compact form and in a minimum of space.

Another object of the invention is to provide means for preventing long grain or "dody" from standing on end and entering the separating screens.

A still further object is to provide connections of a novel character between the reciprocating bars or rocker arms and the rotary shaft carrying a blower.

A still further object is to provide a screen-holding shoe so formed as to permit the screen carried by the shoe to be adjusted to any desired angle to suit the grain which is being run through the shoe, thus providing a means for adjusting the screen to separate various kinds of grain.

For a full understanding of the invention and the merits thereof and also to acquire a knowledge of the details of construction and the means for effecting the result, reference is to be had to the following description and accompanying drawings.

Figure 2:
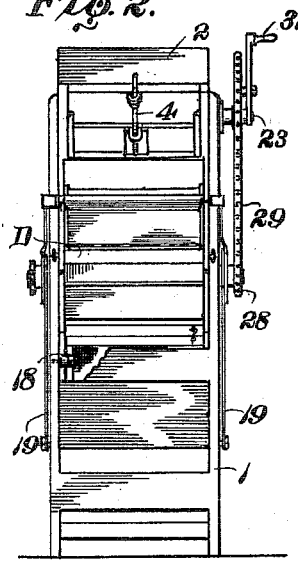
Figure 1:
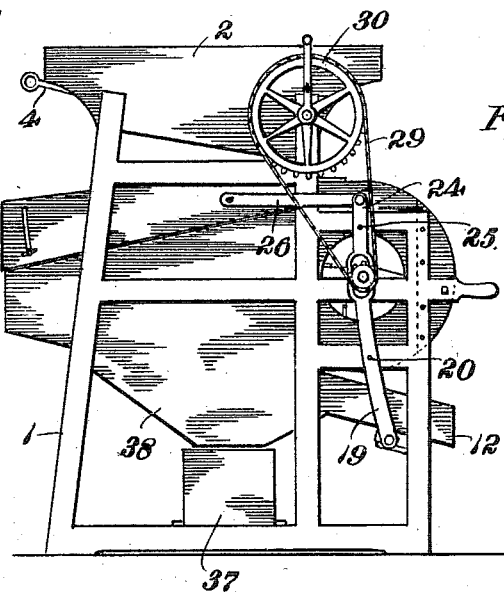
Figure 4:
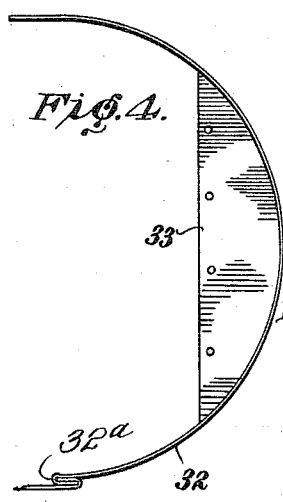
Figure 3:
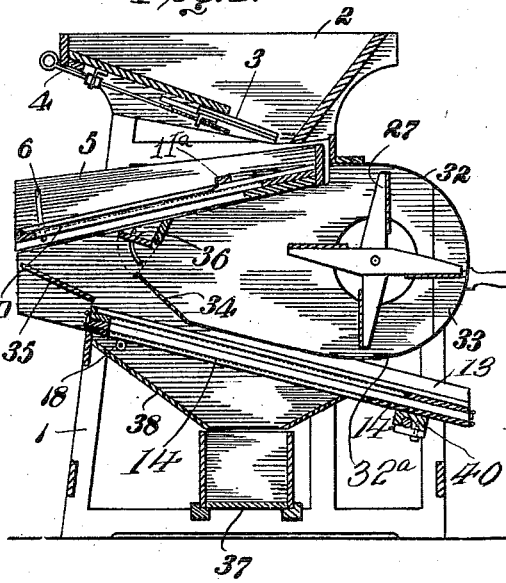
Figure 5:
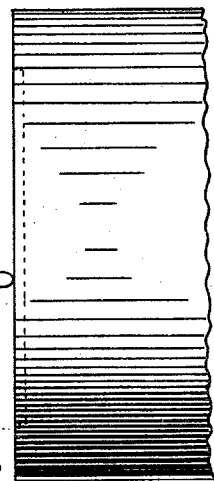

While the invention may be adapted to different forms and conditions by changes in the structure and minor details without departing from the spirit or essential features thereof, still the preferred embodiment is shown in the accompanying drawings, in which:

Figure 1 is a side view of a machine for cleaning and separating grain embodying the invention. Fig. 2 is a rear view. Fig. 3 is a vertical, central, longitudinal section. Fig. 4 is a detail view of a portion of the fan casing or housing. Fig. 5 is a front view of an end portion of the fan casing. Fig. 6 is a longitudinal section of the chaff shoe, the screen being omitted. Fig. 7 is a rear view of the chaff shoe. Fig. 8 is a side view of the chaff shoe with the screen in place, an end portion of the near side being broken away. Fig. 9 is a rear view of the parts shown in Fig. 8. Fig. 10 is a longitudinal section of the chaff screen. Fig. 11 is a top plan view of the chaff screen, a portion of the textile apron being broken away and a corner portion being turned up. Fig. 12 is a sectional view of the chaff screen. Fig. 13 is a top plan view of the chaff screen, a corner portion being broken away. Fig. 14 is an end view of a portion of the screen showing the cove. Fig. 15 is a longitudinal section of the separating shoe on the line A—A of Fig 16, looking in the direction of the arrows. Fig. 16 is a top plan view of the separating shoe. Fig. 17 is an end view of the separating shoe partly folded. Fig. 18 is a top plan view of the separating shoe having the upper separating screen removed. Fig. 19 is a detail view of the means for imparting a reciprocating movement to the chaff and separating shoe. Fig. 20 is a front view of the parts illustrated in Fig. 19.

Corresponding and like parts are referred to in the following description and indicated in all the views of the drawings by the same reference characters.

The machine embodies a suitable framework 1 adapted to support the working parts. A hopper 2 is located at the upper end of the framework and its bottom slopes toward a discharge opening, which latter is regulated by means of a cut-off 3 arranged to be moved by a threaded rod 4. A chaff shoe 5 is arranged below the hopper 2 and inclines to the horizontal from its receiving end toward the discharge. The sides of the chaff shoe widen toward the lower or discharge end of the shoe. A slot 6 is formed in the rear portion of each side of the chaff shoe and curves in its length. A tie rod 7 passes through the slots 6 and is provided with a thumb nut 8 which admits of the side pieces of the shoe being drawn together so as to clamp the chaff screen 9, which is arranged between the side pieces of the shoe. The chaff screen may be removed from the shoe so as to be replaced by another screen of different mesh and its rear or delivery end may be vertically adjusted to vary the inclination of the screen according to the particular result desired. The chaff screen may be of any construction and comprises a framework and a bottom, the latter being either of reticulated metal or wire fabric the mesh being such as to suit the particular work in hand.

A textile cover 11 is placed over the bottom of the screen, said cover extending from the bottom of the screen upward for about three-fourths of its length. The upper end of the cover is attached to a cross bar 11<sup>a</sup> which is formed with or fastened upon the side bars of the screen. It will be seen by reference to Fig. 3, that the textile fabric extends only far enough up the screen to provide an opening at the upper end of the screen through which the grain may pass, and that its purpose is to prevent long grain or particles of straw from passing through the screen. The shoe 5 is mounted to receive a reciprocating movement and is adapted to be operated from the fan shaft by means of eccentrics mounted thereon.

The separating shoe 12 is located below the chaff shoe and inclines in an opposite direction and comprises a suitable frame and a series of superposed separating screens of different mesh. As shown, the separating shoe comprises an upper screen 13 and a lower screen 14, the latter being of a finer mesh than the screen 13. The separating shoe is composed of hinged parts, as indicated most clearly in Fig. 17. A strip 15 is located at the delivery end of the separating screen and inclines across the same from one side to provide a delivery at the opposite side of the screen. A strip 16 serves the same purpose for the lower screen 14 and inclines in an opposite direction to the strip 15 to provide a discharge at the opposite side of the screen 14 to that of the screen 13 so that the grain delivered from each of the separating screens may be separately collected and not mix or interfere. The separating shoe is mounted to receive a reciprocating movement and is supported near its receiving end upon a roller 18. A lever 19, pivoted at 20, is provided at each side of the machine and supports the delivery end of the separating shoe. The upper end of each lever is formed with an elongated opening 21 in which operates an eccentric 22 fast to the fan shaft 23. As the fan shaft rotates, the eccentric 22 imparts an oscillatory movement to each of the levers 19 and the latter in turn impart a reciprocating movement to the separating shoe.

A lever 24 is located at each side of the machine and pivoted at 25, and its lower end has an opening similar to the opening 21 and for a like purpose, namely, to receive the eccentric 22. A link 26 connects the upper end of each lever 24 with the chaff shoe 5 and imparts a reciprocating movement to the latter when the machine is in operation. The space between the chaff and separating shoes is contracted at one end and enlarged at the opposite end, the latter being provided with a fan 27 by means of which a blast of air is created to remove all chaff and light stuff and assist materially in the operation of separating the grain. The fan 27 is mounted upon the shaft 23 and rotates therewith. Any suitable means may be provided for imparting motion to the shaft 23. As shown a sprocket pinion 28 fast to one end of the shaft 23 is connected by sprocket chain 29 to a sprocket wheel 30, with which coöperates a crank 31, thereby admitting of the machine being operated by hand. The space between the shoes 5 and 12 is closed at opposite side pieces and at the rear by means of a curved housing 32, the latter being removable from the side pieces, as indicated in Fig. 4. This housing 32 is formed of a piece of sheet metal bent into curved form and strengthened by pieces 33 of sector shape. The lower end of the sheet metal 32 which forms the rear housing is bent upon itself so as to form a joint 32<sup>a</sup> with the rear end of the sheet metal plate forming the deflector 34. The upper end of the housing slips beneath a cross bar of the frame, or is otherwise attached to the frame, while the sectors 33 may be bolted removably to the side pieces. It will be seen that the rear end of the housing may be easily slipped out of engagement with the joint 32<sup>a</sup>. By having the housing 32 removable, the machine may be more compactly arranged for shipping and storing, besides admitting of access to the fan and shoes being more readily had. A deflector 34 is arranged at the rear end of the bottom of the fan casing and inclines upwardly and rearwardly. A return board 35 is located at the receiving end of the separating shoe and inclines upwardly and forwardly and receives the grain from the delivery end of the chaff shoe and directs the same on to the topmost screen of the separating shoe. A valve 36 is adapted to regulate and space the deflector 34 and to admit of the blast of air engaging with a greater or less extent of the chaff shoe.

A receptacle 37 is located below the separating shoe to receive the grain passing through the lowermost separating screen. A chute 38 directs the grain into the receptacle 37. Other receptacles, not shown, are adapted to receive the grain from the outlets of each of the separating screens 13 and 14, as will be readily understood.

The separating shoe, it will be noted, is composed of two screens 13 and 14 which rest upon each other, the lowermost screen being connected to a cross bar 40, which cross bar is in turn connected to a link 19, whereby the lowermost separator shoe is oscillated. It is desirable that these two screens 13 and 14 should be separable so that an accumulation of straw or chaff between the screens may be readily cleared away. At the same time, it is necessary that the two screens be connected to each other to move together, and so that the uppermost screen will not slip upon the lowermost screen or joggle out of place, as it would do if unattached to the lowermost screen. Under ordinary circumstances, the two screens are rigidly attached to each other, but this prevents the clearing out of the intermediate space, while, if the two screens are loose upon each other, the uppermost screen is liable to gradually move downward. To obviate this difficulty, I connect the upper screen to the lower screen by hinges at the side, thus holding the two screens rigidly together, but permitting the screens to be opened, the removal of the bolt on the cross bar 40 permitting the removal of both screens.

Having thus described the invention, what is claimed as new is:

In a cleaner and separator, the combination with a fan chest and a fan located in one end of the chest, having a shaft passing transversely therethrough, of upper and lower longitudinally reciprocating screen shoes mounted above and below said chest, an eccentric attached to the fan shaft, heads on each side of said eccentric, and upper and lower levers having pivotal connection with the respective shoes to reciprocate the same, said levers being pivoted at their middles, the inner ends of said levers overlapping each other and being slotted to receive the said eccentric, the slotted ends of the levers being received between said heads.

In testimony whereof I affix my signature in presence of two witnesses.

GEORGE T. PEARCE. [L. S.]

Witnesses:
 JAMES G. BERRY,
 B. W. FORNEY.

---

Copies of this patent may be obtained for five cents each, by addressing the "Commissioner of Patents, Washington, D. C."